United States Patent
Nootbaar

(10) Patent No.: US 7,152,825 B2
(45) Date of Patent: Dec. 26, 2006

(54) ADHESIVE TAPE FOR FLYING SPLICE

(75) Inventor: Jens Nootbaar, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 0 days.

(21) Appl. No.: 10/376,036

(22) Filed: Feb. 27, 2003

(65) Prior Publication Data

US 2003/0190445 A1     Oct. 9, 2003

(30) Foreign Application Priority Data

Mar. 7, 2002    (DE)    ............... 102 10 192

(51) Int. Cl.
    *B65H 23/02*    (2006.01)
(52) U.S. Cl. ................ 242/556.1; 242/556; 428/354; 428/343; 428/40.1; 428/42.2; 156/304.1
(58) Field of Classification Search ............ 242/556.1, 242/556; 428/354, 343, 40.1, 42.2; 156/304.1
    See application file for complete search history.

(56) References Cited

U.S. PATENT DOCUMENTS

| | | | | |
|---|---|---|---|---|
| 5,212,002 | A | * | 5/1993 | Madrzak et al. ............ 428/41.9 |
| 5,489,642 | A | * | 2/1996 | Gleichenhagen et al. ... 524/504 |
| 5,692,699 | A | * | 12/1997 | Weirauch et al. ........ 242/556.1 |
| 5,901,919 | A | * | 5/1999 | Wienberg ................ 242/556.1 |
| 5,916,651 | A | * | 6/1999 | Wienberg et al. .......... 428/40.1 |
| 6,595,461 | B1 | * | 7/2003 | Storbeck et al. ......... 242/556.1 |
| 2001/0003617 | A1 | * | 6/2001 | Sorbeck et al. ....... 428/355 AC |
| 2002/0045019 | A1 | * | 4/2002 | Gassner et al. ............ 428/41.8 |

FOREIGN PATENT DOCUMENTS

| | | |
|---|---|---|
| DE | 42 10 329 A1 | 10/1993 |
| DE | 195 44 010 A1 | 5/1997 |
| DE | 196 32 689 A1 | 2/1998 |
| DE | 198 30 673 A1 | 1/2000 |
| EP | 0 555 772 A1 | 5/1993 |
| WO | WO 91/08159 | 6/1991 |

OTHER PUBLICATIONS

Copy of European Search Report.
Copy of German Search Report.

* cited by examiner

*Primary Examiner*—Daniel Zirker
(74) *Attorney, Agent, or Firm*—Norris McLaughlin & Marcus PA

(57) ABSTRACT

Adhesive tape for the flying splice of flat web material wound up into rolls, said tape having an adhesive face and a nonadhesive reverse and also two longitudinal edges (L1, L2), and having a main carrier coated unilaterally on the face with a self-adhesive composition, only part of the nonadhesive reverse being provided with at least one self-adhesive system, wherein the main carrier is composed, at least in the region of the self-adhesive system, of splittable material.

19 Claims, 5 Drawing Sheets

5a

5b

ADHESIVE TAPE FOR FLYING SPLICE

The invention relates to an adhesive tape for the flying splice of flat web material wound up into rolls, said tape having an adhesive face, a nonadhesive reverse, and two longitudinal edges, and having a main carrier which is coated unilaterally on the face with a self-adhesive composition, a portion of the nonadhesive reverse being provided with at least one self-adhesive system, and to a process for the flying splice of flat web material wound up into reels, for which an adhesive tape of said kind is suitable.

Flying splice in paper mills or the like is a common technique for replacing an old, almost fully unwound roll of paper by a new roll without having to stop the machines, which run at high speed. It is accomplished using double-sided self-adhesive tapes, so-called tabs, which on the one hand possess high adhesion and high tack and on the other hand, owing to their water-soluble self-adhesive compositions and paper carriers, do not interfere with re-use of the paper wastes in the paper machine. These tabs are bonded artistically in a zigzag form to the start of the web, a procedure requiring experienced personnel, with only about 4 to 13 minutes' time remaining for the entire procedure, owing to the high speed of the machines.

Although this technology is well established, it is not without certain disadvantages. Thus, experienced personnel are required, the procedure is intrinsically hectic, and the bonds are relatively thick, since in each case two plies of web and the adhesive tab in between are the result: a result which is unwanted in the paper industry, since the high thickness may result in tearing, inter alia, at the coating blade in paper coating machines.

There are various products on the market, known as tabs, for this butt splicing in flying splice, which in addition to a paper carrier are coated on both sides with a water-soluble self-adhesive composition. Adhesive tapes of this kind are marketed, inter alia, under the name tesafix (tesa AG).

Additionally, the prior art includes adhesive tapes which are provided with splittable paper carriers and described, for example, in DE 196 28 317 A1 and DE 199 02 179.1-43. These adhesive tapes are also available commercially, under the names EasySplice PrintLine and FastLine.

Although these EasySplice adhesive tapes are thinner, even in relation to the thickness of the bond site, than the conventional adhesive tapes for butt-end bonding, the type of adhesive tape described below allows a further substantial reduction in splice thickness and so distinctly reduces the probability of tearing. The thickness of standard commercial adhesive tapes for continuous bonding is 170 μm in the region of the spoilable strip in the split state. Using as example a 39 g/m$^2$ coating base paper (30 μm), this gives a splice thickness at the leading edge in the production direction of 200 μm. This is the important thickness, since on passage through processing machinery it comes into contact first with coating units, printing cylinders or the like, and it is here that, owing to the shape and thickness of the splice, there is a particular risk of tearing.

Also prior art is an adhesive tape wherein the paper carrier is coated bilaterally with a water-soluble self-adhesive composition and wherein the paper carrier is composed of a readily splicing paper. This adhesive tape is described in DE 196 32 689 A1. A paper carrier is disclosed which splits across its full width. With this mode of operation there is a dramatic reduction in the ultimate tensile stress strength of the split paper and hence in the maximum possible web tension to be transmitted. In the case of centrally split papers, it is reduced by at least 50%. Where the plane of splitting is not central, the ultimate tensile stress strength may also be reduced well below 50%.

It is an object of the invention to provide an adhesive tape for flying splice which minimizes the thickness in the region of the bond of the old web and the new web while retaining the complete ultimate tensile stress strength in order to accommodate the maximum web tension.

This object is surprisingly achieved by the invention as described hereinbelow.

Thus, it has surprisingly and unexpectedly been found that the adhesive tapes were in the reverse of a splittable main carrier is provided only partially with a self-adhesive system are outstandingly suitable for flying splice without uncontrolled tearing of the main carrier material during the splicing operation.

The main claim accordingly provides an adhesive tape suitable for the flying splice of flat web material wound up into rolls, having an adhesive face and partially adhesive reverse and also two longitudinal edges 14, 15, the adhesive tape 1 being provided with a main carrier 2 which is unilaterally coated on the face with a self-adhesive composition 3 (self-adhesive face layer), a portion of the reverse of the main carrier (covered reverse), being provided with at least one self-adhesive system 6 (reverse-side self-adhesive system), the main carrier 2 being composed, at least in the region of the self-adhesive system 6 (in the region of the covered reverse), of splittable material, so that, when a bond effected by this adhesive tape 1 between two adherents, in particular two paper webs, is parted, the main carrier 2 of the adhesive tape 1 splits essentially only in the region of the reverse-side self-adhesive system(s) 6.

Very advantageously, the portion of the reverse equipped with one or more self-adhesive systems 6 amounts to up to 50% of the entire area of the reverse, preferably between 6 and 48%, in particular from 18 to 24%, it also being possible for the covered portion of the reverse to be divided into two or more areas each equipped with a self-adhesive system 6.

In one preferred embodiment the rear self-adhesive system 6 is selected such that it does not possess its own carrier but instead comprises a carrier-free self-adhesive system. Advantageously for this purpose a strip of a carrier-free self-adhesive tape is bonded to the bottom of the main carrier 2; alternatively, the self-adhesive composition can also be laminated on or applied using a nozzle.

In a further advantageous embodiment, at least one of the reverse-side self-adhesive systems 6 also possesses a carrier (secondary carrier). In this case, for example, the reverse-side self-adhesive system may also comprise a double-sided self-adhesive tape.

The secondary carrier or carriers are advantageously selected such that their splitting resistance when the adhesive tape of the invention is employed in accordance with the invention has the effect that the secondary carrier or carriers are nonsplitting or else have a greater splitting resistance than the main carrier 2 in the splitting region, so that the main carrier 2 splits preferentially.

The dimensions of the adhesive strip of the invention may be chosen differently depending on the field of application and intended application, and so tailored to the particular requirements. Examples of advantageous product dimensions are strips of 75 mm in width, of 50 mm in width, and of 38 mm in width, without wishing to be restricted by these figures.

The adhesive tape of the invention may be provided with perforations or incisions allowing it to be divided into sections of defined length.

In one preferred embodiment the reverse-side self-adhesive system 6 or, in the case of two or more reverse-side self-adhesive systems 6, the first such system (the one lying closest to the longitudinal side 14) is indented in the region of the leading edge (longitudinal edge 14) of the adhesive tape, so that the main carrier 2 protrudes beyond the reverse-side self-adhesive system 6 on the side of the leading edge 14 by the length $E_S$, the indentation $E_S$ being advantageously up to 15 mm, in particular from 0.5 to 15 mm, preferably from 1 to 7 mm, very preferably from 1.5 to 3.5 mm. One specific embodiment of the adhesive tape of the invention has an indentation of $E_S$=3mm.

In advantageous adaptation to the respective application, preference may likewise be given to using a variant of the adhesive tape of the invention wherein the (first) reverse-side self-adhesive system 6 lies directly at the leading side 14 of the main carrier 2—in other words, is not indented.

Moreover, for certain applications it may be of advantage if two or more self-adhesive systems 6 are provided on the reverse of the main carrier 2, for instance such that the adhesive tape is provided with two or more self-adhesive strips. Particularly advantageous adhesive tapes are those having one or two reverse-side self-adhesive systems 6.

The reverse-side self-adhesive systems 6 advantageously have a width of from 3 to 18 mm, in particular a width of 3 to 9 mm, especially 9 mm.

In one preferred embodiment, the main carrier 2 may have on its reverse, at at least one point, a slit 7a or perforation, the depth T of the slit or perforation being in particular less than the thickness of the main carrier (referred to collectively below as slot). The slot is preferably behind (slot 7a) and where appropriate, in front of as well (slot 7b) the reverse-side self-adhesive system(s) 6 (as viewed from the longitudinal edge 14). It may be located directly before and/or behind the self-adhesive system(s) 6, but also at some distance, advantageously up to 3 mm. In the case of two or more reverse-side self-adhesive systems 6, the slots may be provided before and/or behind each individual reverse-side self-adhesive system (in the case, for example, of large distances between the reverse-side self-adhesive systems) before and/or behind some of the reverse-side self-adhesive systems, but very advantageously before the first and/or behind the last of the reverse-side self-adhesive systems. Each slot may amount advantageously to up to 50% of the thickness of the main carrier, and supports the functioning of the adhesive tape of the invention in use such that the main carrier splits only in the desired region (region of the strip in the vicinity of the slot or between the slots) (slotting behind the rear self-adhesive system halts tear propagation).

In one advantageous embodiment of the adhesive tape of the invention the main carrier 2 is wholly composed of splittable material. In another advantageous embodiment of the adhesive tape of the invention the main carrier 2 is composed of splittable material only in one selected region and is not (very) splittable in the other regions. This can be actualized, for example, by producing the regions with no splittability or with low splittability by stabilizing the regions which are not to be split during use, by impregnating them with appropriate chemicals, for instance, before coating with self-adhesive composition a main carrier which is splittable per se.

The main carrier 2 is preferably composed of paper. Examples of suitable papers include, in particular, readily splittable paper systems or duplex papers.

The splittable main carrier 2 is preferably chosen so that splitting takes place substantially symmetrically, i.e., centrally in the plane of the main carrier. Substantially symmetrically means in this context that it is ensured that, on splitting, the residue 2a of main carrier which remains in the splitting region is not too thin (the thickness of the residue 2a of main carrier should advantageously be at least 20 µm).

As main carrier 2 it is very preferred to use a substantially symmetrically splitting paper which has a splittability (measurement method: tesa JOPM0051) of from 10 to 50 cN/cm, in particular from 20 to 40 cN/cm, very particularly from 20 to 30 cN/cm.

The measurement of the splitting resistance of the paper is carried out as follows (tesa JOPM0051):

Test specimens: DIN A4 sheets. The specimens must be acclimatized under standardized conditions for at least 16 h.

In the specified direction of testing (transverse unless specified otherwise), two strips of adhesive tape from both sides are placed opposite one another on the test paper and gently brushed with the finger in order to prevent air inclusions. The adhesive bond is to be produced so that on one side the ends of the adhesive tape protrude beyond the test specimen and can be folded over and bonded to one another to form a grip tab.

A manual roller is then run over the bond rapidly, twice per side, in order to achieve an unimpaired bond strength. Using a steel rule, strips 15 mm wide are cut out centrally from the bond, in a length of about 20 cm. The two grip tabs of the protruding adhesive tape are then pulled apart by hand until splitting of the paper test specimen is acceptable. The test specimen is then clamped into the tensile tester, hanging freely above and below by the grip tabs, and the remainder of the strip is pulled apart at a constant speed of 300 mm/min. In the case of very thin papers, care must be taken to ensure that the result is not falsified by the opposing edges of the adhesive tape contacting the edge of the test specimen and sticking.

The splitting resistance is reported in cN/cm, rounded to whole numbers, with the test direction (example: splitting resistance, transverse: 34 cN/cm).

As already set out above, the adhesive tape of the invention has at least two self-adhesive layers, namely a layer 3 of self-adhesive composition on the face of the main carrier 2 (self-adhesive face layer) and also a self-adhesive system 6 on the reverse of the main carrier 2 (reverse-side self-adhesive system).

The adhesive used for the self-adhesive face layer 3 is preferably selected with a high tack (initial tack), while for the reverse-side system 6 it is advantageous to use a (self-)adhesive composition possessing shear strength.

In one very preferred embodiment of the invention the self-adhesive compositions used are acrylic pressure sensitive adhesives. With advantage, both water-soluble and water-insoluble acrylates can be used. Furthermore, it is also possible to use natural and synthetic rubber compounds and also dispersions of the compounds described above. It is pointed out that in principle all basic types of pressure sensitive adhesives which are suitable for such bonds can be used.

On the face, adhesives of high shear strengths are of interest for application on a calender or in the case of use on a dryer. For application in the paper industry or in the case of normal newspaper printing, it is advantageous to use high-tack adhesives on the face.

The shear strength is advantageously measured as follows (tesa JOPM002):

The shear strength of adhesives is measured by coating them onto a standard carrier (polyester film; thickness: 25 µm). It is advantageous to select an application rate of 25 g/m², equal in each case.

After drying and, where appropriate, crosslinking of the adhesive, a strip 13 mm wide and at least 20 mm long is cut out and adhered to a defined paper (e.g., gravure paper, e.g., Neopress T 54, 54 g/m², or coating base paper, e.g., Mediaprint, 135 g/m²). The bond area is 13 mm×20 mm. In order to ensure a constant applied pressure when bonding, the test specimen is rolled over slowly twice using a roller (weight: 2 kg). The test specimen thus produced is loaded with a weight of 1 kg parallel to the bond plane and the time for which the adhesive strip remains on the paper is recorded.

To better differentiate the individual adhesives, the test is conducted correspondingly at further test temperatures (e.g., 40° C. and 70° C.).

In order to ensure error-free operation, the adhesive must hold a weight of 1 kg for more than 1 000 minutes on coating base paper and for more than 2 000 minutes on gravure paper at 23° C. and 55% relative humidity.

As self-adhesive compositions of high shear strength, particularly for the self-adhesive composition 6 (reverse-side self-adhesive system), it is possible, for example, to use acrylic self-adhesive compositions of the following composition:

from 40 to 90% by weight acrylic acid, from 60 to 10% butyl acrylate, or from 40 to 90% by weight acrylic acid, from 30 to 5% by weight butyl acrylate, from 30 to 5% by weight ethylhexyl acrylate Plasticizer addition: ethoxylated alkylamines, preferably C16 to C18, more preferably having from 15 to 25 ethoxy units.

The blend of plasticizer of polymer amounts to from 55 to 75% by weight plasticizer and from 25 to 45% by weight polymer.

Polymerization is performed by a free-radical mechanism in polar solvents using ethanol as regulator. Partial crosslinking takes place when the pressure sensitive adhesive films of the polyvalent cations are dried by addition of aluminum chelate or titanium chelate (from 0.3 to 1.2% by weight, based on the total amount).

As self-adhesive compositions of high tack, particularly for the self-adhesive composition 3, it is possible, for example, to use acrylic adhesives of the following composition:

from 30 to 70% by weight acrylic acid, from 15 to 35% by weight butyl acrylate, from 15 to 35% by weight ethylhexyl acrylate Plasticizer addition: ethoxylated alkylamines, preferably C16 to C18, more preferably having from 15 to 25 ethoxy units.

The blend of plasticizer of polymer amounts to from 55 to 75% by weight plasticizer and from 25 to 45% by weight polymer.

Polymerization is performed by a free-radical mechanism in polar solvents using ethanol as regulator. Partial crosslinking takes place when the pressure sensitive adhesive films of the polyvalent cations are dried by addition of aluminum chelate or titanium chelate (from 0.1 to 0.5% by weight, based on the total amount).

As further examples of self-adhesive compositions which can be used with advantage, mention may be made of repulpable pressure sensitive adhesives based on a graft polymer in which from 3 to 20% by weight of vinyl compounds containing sulfonic-acid salt groups have been grafted onto a copolymer of (meth)acrylates and (meth)acrylic acid, and which has been formulated for pressure sensitive adhesion using water-soluble plasticizers. Incorporated by reference in this context is the entire disclosure content of DE 43 40 297 A1 and of U.S. Pat. No. 5,489,642.

As advantageous possibilities for use, mention may further be made of a water-soluble pressure sensitive self-adhesive composition composed of a mixture containing, based on 100 parts by weight of solids, a) from 30 to 80 parts by weight of a copolymer of 70 to 88% by weight butyl acrylate and 12 to 30% by weight of vinylcarboxylic acid, from 3 to 12% by weight of whose butyl acrylate fraction, based on the total weight of the monomers, may have been replaced by 2-ethylhexyl acrylate and/or from 5 to 25% by weight of whose butyl acrylate content, based on the total weight of the monomers, may have been replaced by a mixture of vinyl acetate and a dialkyl fumarate, and b) from 20 to 70 parts by weight of an ethoxylated (alkyl) phenol, an ethoxylated alkyl monoamine or alkyl diamine or an ethoxylated alkylammonium compound as plasticizer, the acid content of the copolymer having been neutralized almost completely with potassium hydroxide (solution), preferably with the use of an excess of this base.

Accordingly, the entire technical disclosure content of DE 31 05 894 A1 may be incorporated here.

In a further preferred embodiment, the self-adhesive face layer 3 is provided with a liner 4 which is provided where appropriate with a perforation or a slit 5 in the longitudinal direction. As liner material it is possible, for example, to use siliconized release paper. The slit 5 may preferably be provided at a distance A of from 10 to 40 mm from the longitudinal edge 15 of the adhesive tape which is opposite to the leading longitudinal edge 14 in the vicinity of which the self-adhesive system 6 is arranged. In order to ensure the full tensile strength of the paper backing 2 and of the web tensions to be transmitted maximally therewith, the distance M between the slit 5 in the release paper and the slot 7a in the main carrier, is advantageously at least 5 mm.

In one advantageous embodiment, the adhesive tape is equipped with at least one means, detectable mechanically (without contact) by means of a detector, detection being achieved preferably by means of metal, transponder systems, or optical devices.

In one preferred variant the main carrier or regions thereof is or are composed of material to which at least one detectable additive has been added, and/or the main carrier comprises at least one layer of a detectable material.

In one embodiment of the inventive adhesive tape, for example, metal powder or granules are admixed to the actual main carrier material, or the substructure of the main carrier is provided with one or more metal layers. In another variant of the inventive adhesive tape the integrated signal function is realized by providing the main carrier on the top and/or bottom with an aluminum layer, advantageously over the full area. Instead of aluminum, any other materials detectable in accordance with the requirements may be used as layer, particularly metals, examples being copper, silver, and gold.

Layers of this kind are located advantageously on the face of the adhesive tape or of the main carrier.

In a following embodiment of the invention, the detection is brought about by means of transponder systems, in particular thin-film transponders, which are integrated into the adhesive tape. Versions with active and passive transponders are realizable here.

In another embodiment of the inventive adhesive tape the adhesive tape is provided with optically registerable means. These may, for example, be bar codes which can be read by a laser. When bar codes are used it is possible, in addition to the actual detection effect, to transmit information as well, on the nature or web thickness of the new roll, for example. Thus when using rolls of different kind or quality it is possible to adjust the processing unit automatically to the new processing conditions without the need for a further external control.

The functioning of optical reflectors or diffraction gratings mounted in or on the main carrier of the adhesive tape is similar. They may likewise be detected optically and initiate the splicing operation.

A further example of optically detectable devices are defined colorations of the main carrier which can likewise be registered by means of suitable detecting systems.

The invention further provides a process for the flying splice of flat web material wound up into rolls, in which the topmost paper web 11 of a new roll is fixed with an adhesive tape 1 which has a main carrier 2 coated unilaterally on the face with a self-adhesive composition 3, and in which a portion of the reverse is equipped with at least one self-adhesive system 6, to the underlying web 12 and a portion of the self-adhesive face layer 3 which is needed for the splicing process lies exposed, whereupon the new roll thus equipped is placed adjacent to an almost fully unwound old roll requiring replacement and is accelerated to substantially the same speed of rotation as said roll, then is pressed against the old web 13, the exposed region of the self-adhesive face layer 3 of the adhesive tape 1 adhering to the old web 13 with substantially identical web speeds, while at the same time the main carrier 2, made of spliceable material, splits substantially in the region in which it is equipped with the rear self-adhesive system 6 in such a way that after the splitting operation there are no adhesive regions exposed.

In a development of the inventive process, the adhesive tape 1 is bonded at right angles to the running paper web. In one advantageous variant of the inventive process, the adhesive tape may also be bonded at an acute angle of up to 30° with respect to the running paper web, in particular an angle of up to 10°.

In the splicing process, an adhesive tape 1 is bonded in a straight line beneath the topmost web 11 to a new paper roll. Bonding takes place such that a part of the adhesive tape 1 remains free for bonding with the expiring web 13.

The adhesive tape 1 is preferably bonded in a straight line beneath the topmost paper web 11 of the new roll so that a part of the adhesive tape 1 remains free while the reverse-side self-adhesive system 6 of the adhesive tape 1 bonds to the underlying web 12 and thus secures the topmost web 11. If desired, first of all only a part 4a of the liner 4 present where appropriate on the self-adhesive face layer 3 has been removed, so that the part of the self-adhesive layer 3 that is required for the splicing process is still lined with the liner 4b and the roll in this state does not have a free adhering surface. At this point, for final preparation for the splicing process, any remaining liner 4b still present is removed, after which the new roll thus equipped is placed adjacent to an old roll which has almost totally unwound and requires replacement, and is accelerated to the same speed of rotation as the old roll, then is pressed against the old web 13, the exposed region of the self-adhesive face layer 3 of the adhesive tape 1 bonding to the old web 13, with the speeds of the web being substantially the same, while at the same time the main carrier 2 splits substantially in the region in which it is equipped with the rear self-adhesive system 6 and nonadhesively lines the rear self-adhesive system 6 with the remnant 2a of the main carrier 2 which remains on said system 6.

After contact of the adhesive tape 1 with the expiring web 13, therefore, the main carrier 2 of the adhesive tape splits in the region provided with the reverse-side self-adhesive system 6, so that the topmost paper ply 11 of the new bale is released and there are no longer any sticky residues.

The aim below is to describe the invention in more detail with reference to an exemplary embodiment, without, however, wishing to restrict it unnecessarily by so doing.

In the drawings

Figure 1:
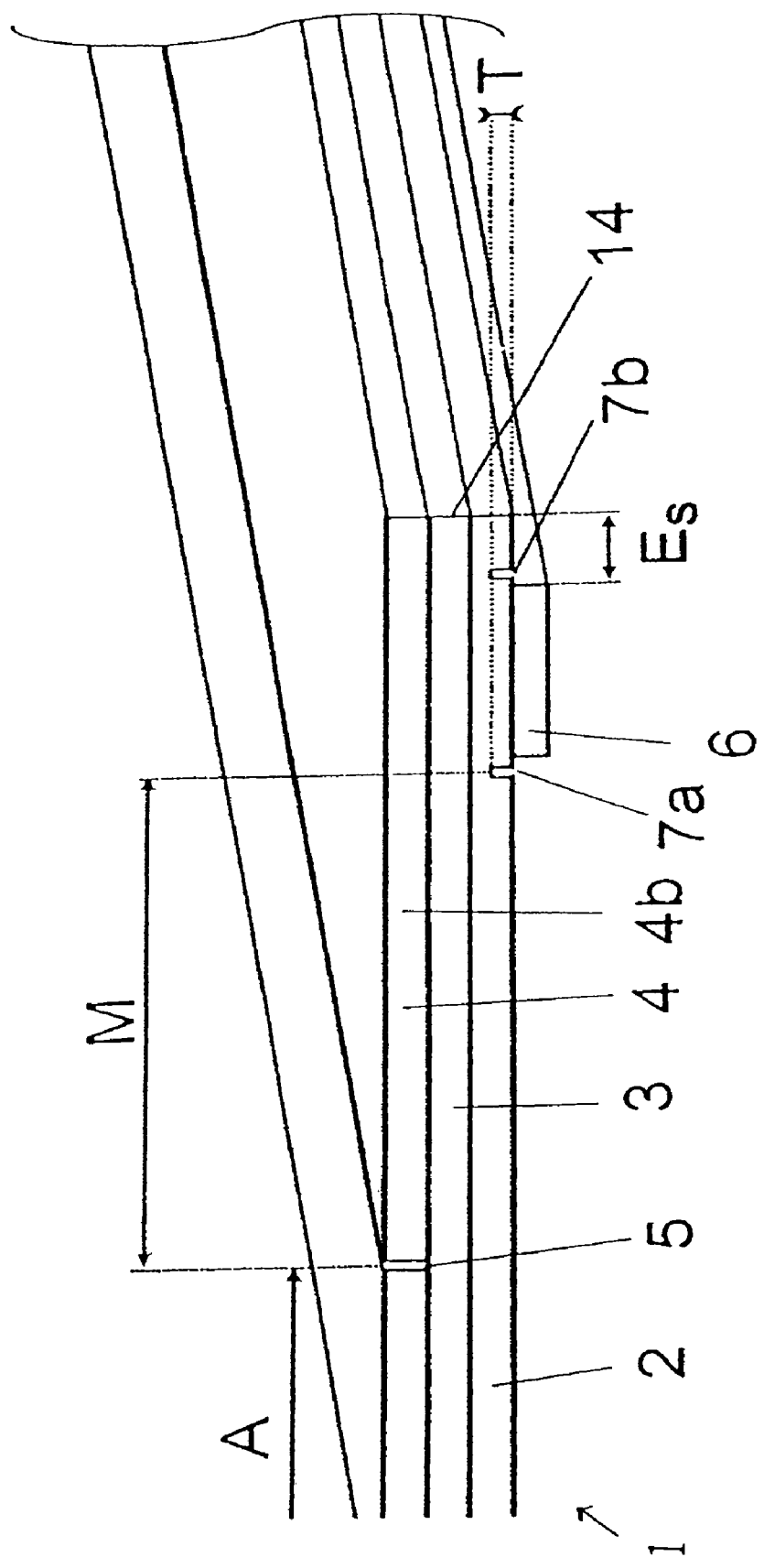
FIG. 1 shows a diagrammatic side view of an adhesive tape of the invention
Figure 5:
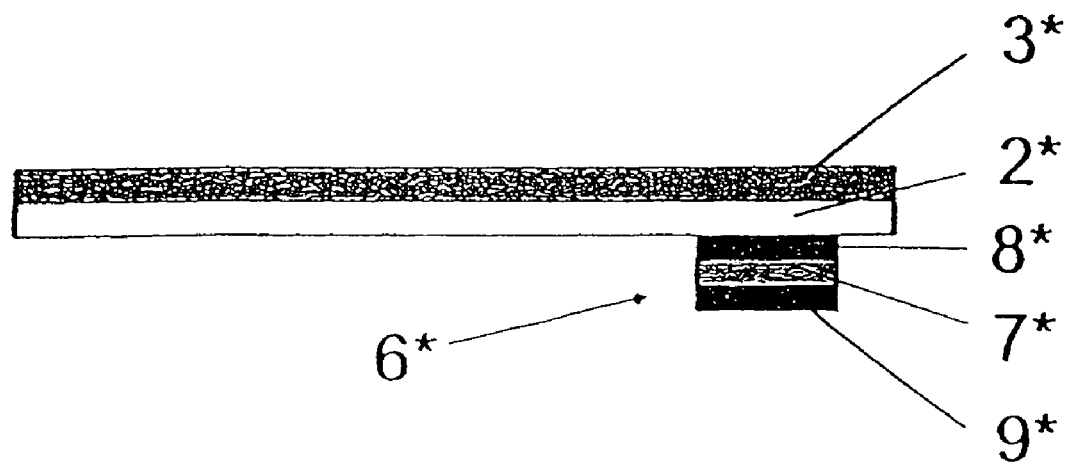
Figure 5:
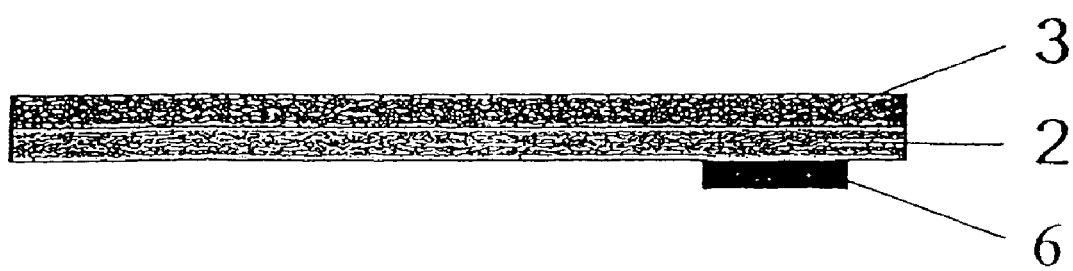

FIG. 5a) shows an adhesive tape of the invention b) and an adhesive tape according to the prior art in a comparison of the layer thicknesses An exemplary embodiment of an adhesive tape of the invention is shown in FIG. 1. Illustrated is an adhesive tape 1 having a main carrier 2 comprising single-sided label paper which does not possess wet strength (basis weight 70 g/m$^2$, thickness 55 μm). The main carrier 2 is unilaterally coated with a high-tack adhesive 3 (self-adhesive facing layer), with an application rate of 55 g/m$^2$. The total thickness of the main carrier 2 with self-adhesive composition 3 is approximately 110 μm, the width 50 mm. The self-adhesive composition 3 is lined with a siliconized release paper 4. At a distance of 17 mm from the left-hand edge said paper 4 is provided with a slit 5, so that the left-hand part 4a of the release paper 4 can be removed first, then the right-hand part 4b.

At the right-hand end the adhesive tape 1 is provided with a strip of a self-adhesive composition 6 (reverse-side self-adhesive system), possessing shear strength, with an application rate of 40 g/m$^2$; the strip of the self-adhesive composition 6 possessing high shear strength has a width of 9 mm. The distance $E_S$ of the strip of the self-adhesive composition 6 possessing shear strength from the leading edge 14 of the adhesive tape 1 is 3 mm.

The main carrier of the adhesive tape 1 is provided with a slot 7a behind the reverse-side self-adhesive system 6 and, optionally, with a slot 7b before the reverse-side self-adhesive system 6.

Figure 2:
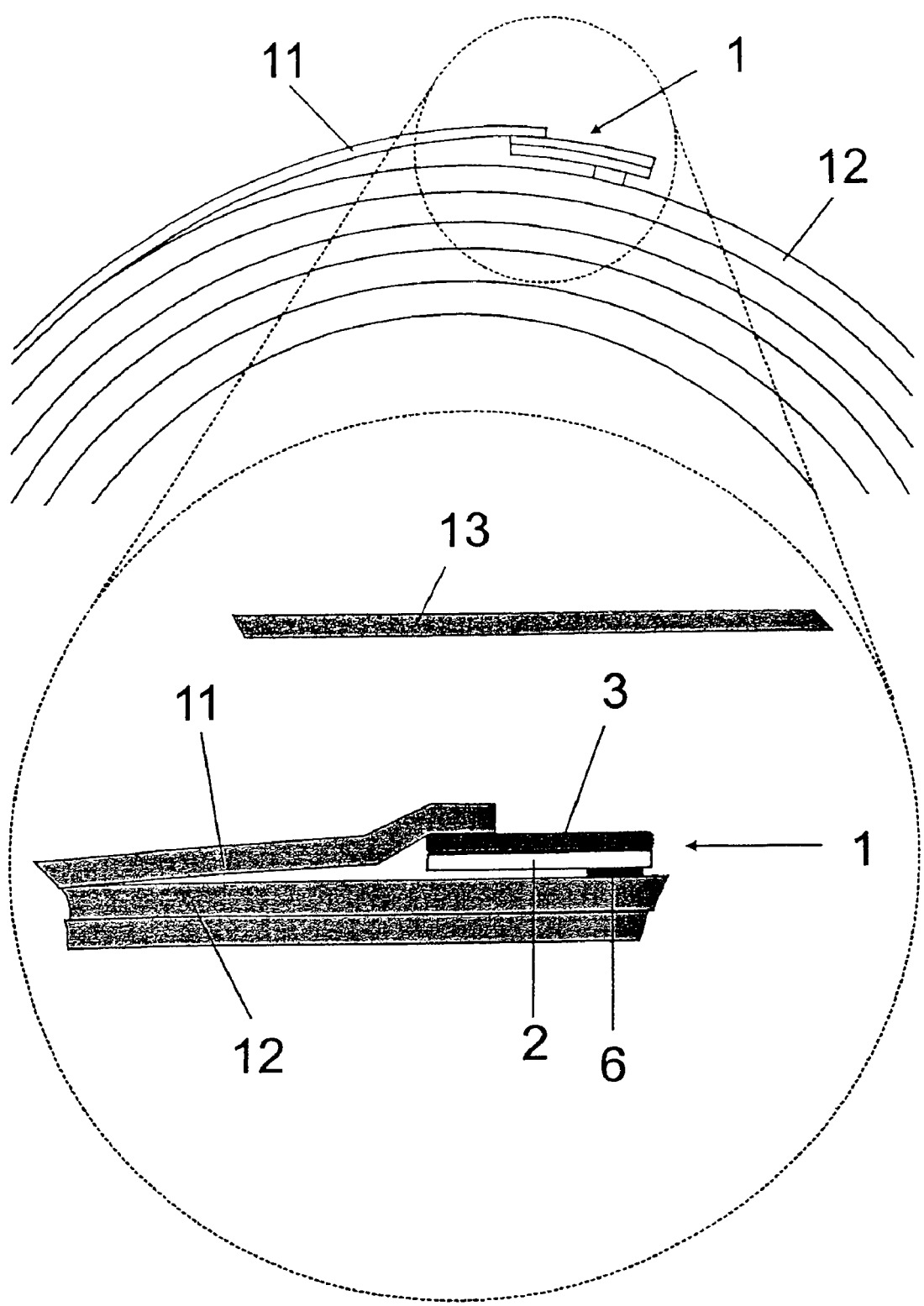
FIG. 2 shows a diagrammatic side view of an adhesive tape according to FIG. 1, adhered to a paper roll and ready for flying splice

FIG. 2 shows how such an adhesive tape 1 is bonded beneath a paper web 11 of a new paper roll, specifically by the left-hand part, after the part 4a of the release paper 4 has been removed from it. Beforehand, the adhesive tape with the reverse-side self-adhesive system 6 has been bonded to the paper web 12 of the paper roll lying beneath the paper web 11. The right-hand part 4b of the release paper 4 has also been removed, so that the paper roll thus equipped is ready for a flying splice, the bond of the adhesive tape 1 running at a right angle over the roll.

Part of the self-adhesive face layer 3 is now exposed and represents the area of contact with expiring webs for the flying splice. The contact area has a width of 33 mm and extends across the entire width of the paper roll.

The (new) paper roll thus equipped is placed next to the unwound (old) paper roll to which the new roll is to be attached. The new paper roll is accelerated to a speed of rotation which corresponds very closely to the speed of the expiring web. When the two speeds have been sufficiently synchronized, the splice can be performed.

Figure 3:
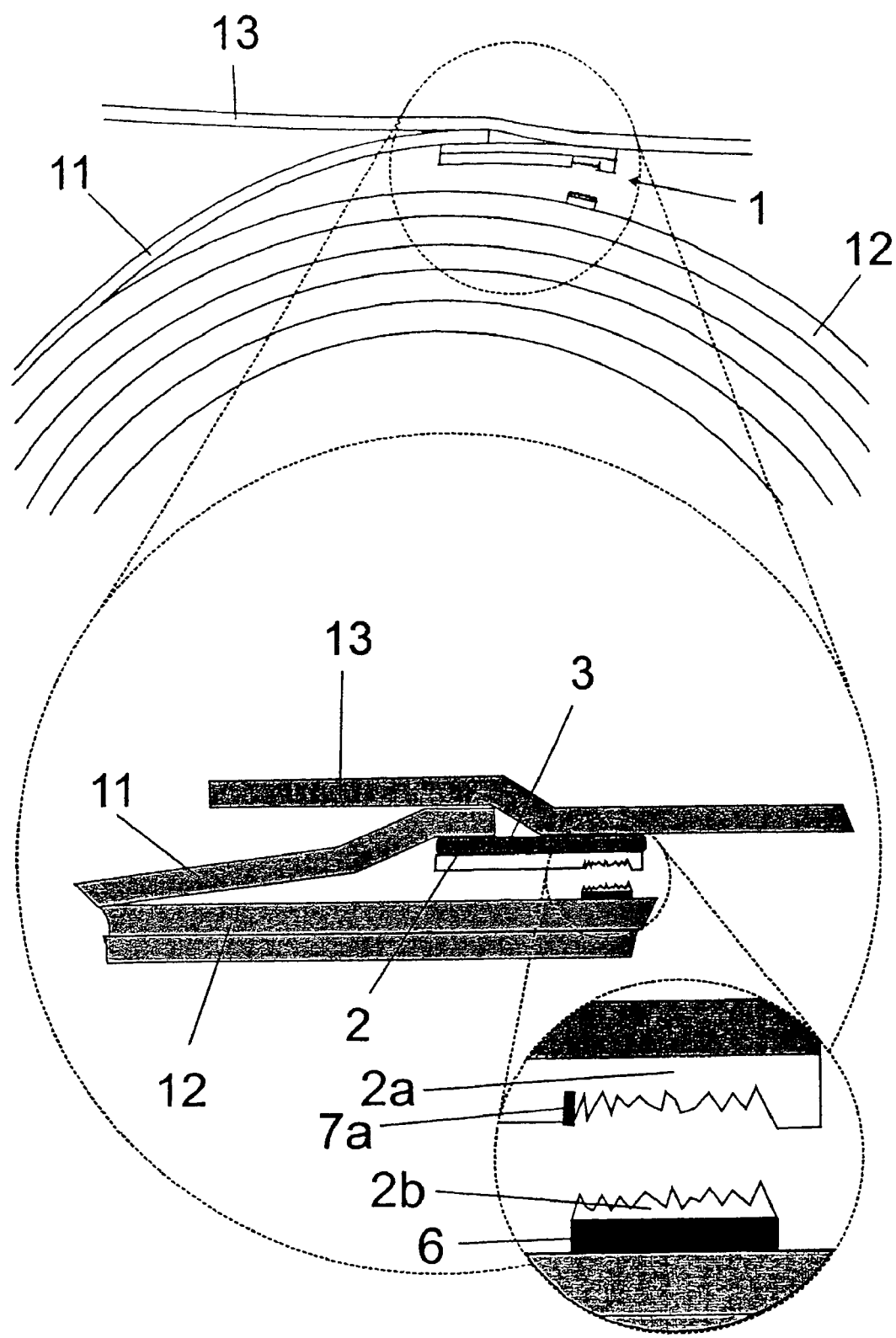
FIG. 3 shows a view as in FIG. 2 but after flying splice has taken place FIG. 4a) shows a diagrammatic side view of an adhesive tape of the invention with two reverse-side self-adhesive systems b) a view of the adhesive tape from FIG. 4a) in accordance with FIG. 2

The expiring web 13 is brought into contact with the periphery of the new roll by means of a pressure shaft (not shown), and the exposed region of the self-adhesive face layer of the adhesive tape is bonded, in accordance with FIG. 3 to the expiring paper web 13. A moment after adhesive contact, the main carrier composed of splittable material splits substantially in the region in which it is equipped with the rear self-adhesive system 6. A part 2a of the main carrier 2 remains on the self-adhesive facing layer 3, while the rear self-adhesive system 6 is nonadhesively lined with the remainder 2b of the main carrier 2 that remains on said system 6. Accordingly, both self-adhesive compositions (3 and 6) have been neutralized, so to speak, no longer adhere and so also no longer disrupt operation in the paper processing machines.

Figure 4:
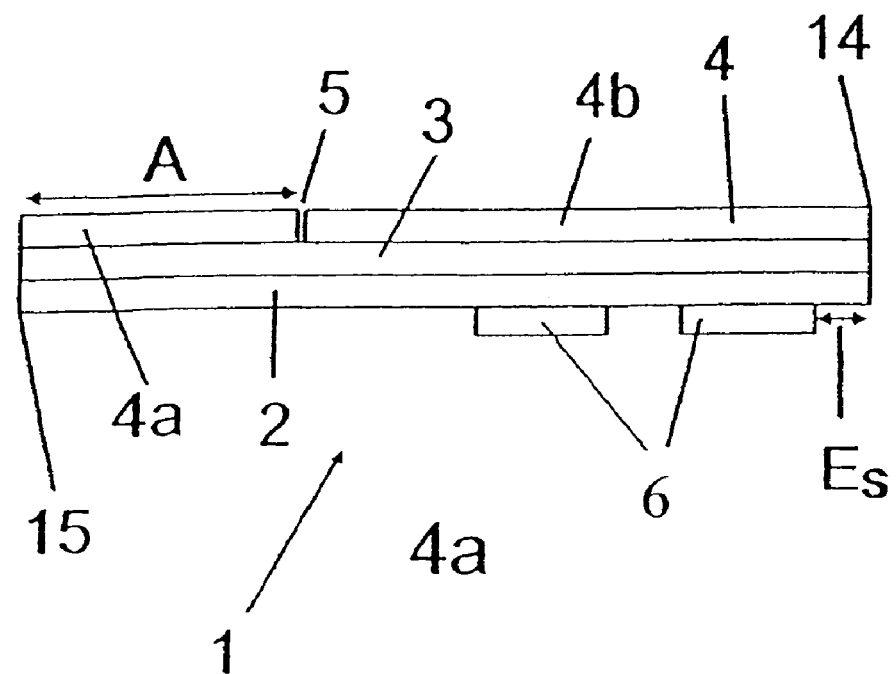
Figure 4:
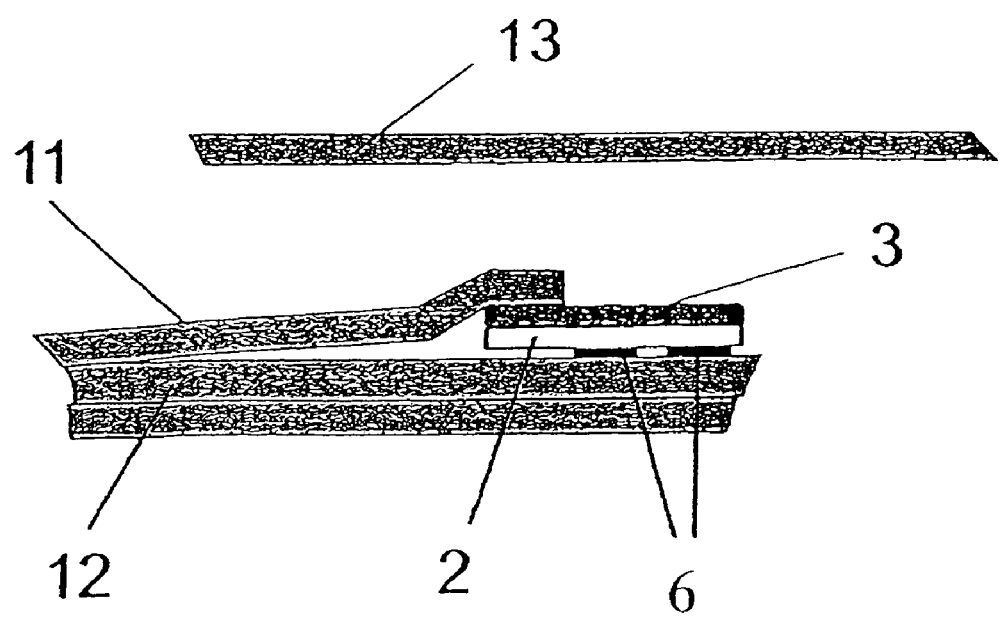

FIG. 4 shows by way of example an embodiment of the adhesive tape of the invention with two reverse-side self-adhesive systems 6. When this embodiment is used, as well, these paper splits substantially only in each case in the regions in which the main carrier is provided with the rear self-adhesive systems 6.

Unexpectedly, the adhesive tape of the invention is outstandingly suitable for flying splice. Thus, given a suitable design of the adhesive tape 1, the splitting of the main carrier 2 takes place essentially only in the region in which the main carrier 2 has been provided with the rear-side self-adhesive system 6.

Very advantageously, with the adhesive tape 1 of the invention it is possible to reduce sharply the thickness of the join at the transition from the old roll to the new one. This gives rise to considerable technical advantages for the untroubled progress of the paper processing operation. The advantage will be depicted here by way of example in comparison with a prior art adhesive tape for flying splice (cf., for example, DE 196 28 317 A1, DE 199 02 179 A1):

The prior art adhesive tape possesses the following construction (cf. FIG. 5a; shown without liners):

A main carrier 2*, provided with a layer of a self-adhesive composition 3* on the face and provided with a strip of a splittable system 6* on the reverse of the main carrier. The splittable self-adhesive system is in turn constructed from a splittable carrier 7*, provided with a film of a self-adhesive composition 8* on the face of the splittable carrier, for bonding to the main carrier 2*, and provided with a film of self-adhesive composition 9* on the reverse of the splittable carrier, for bonding to the new paper roll.

| The layer thicknesses are as follows: | |
| --- | --- |
| self-adhesive layer 3* (application rate 55 g/m²) | 50 μm |
| main carrier 2* | 65 μm |
| self-adhesive layer 8* (application rate 30 g/m²) | 27.5 μm |
| splittable carrier 7* | 55 μm |
| self-adhesive layer 9* (application rate 40 g/m²) | 37.5 μm |
| | =235 μm |
| after the splicing operation, assuming symmetrical splitting of the carrier: | |
| minus thickness of the self-adhesive layer 9* minus half the thickness of the splittable carrier 7* | =170 μm |

The adhesive tape of the invention, on the other hand, has the following dimensions (FIG. 5b):

| | |
| --- | --- |
| self-adhesive composition 3 (application rate 55 g/m²) | 50 μm |
| main carrier 2 | 55 μm |
| self-adhesive composition 6 (application rate 40 g/m²) | 37.5 μm |
| | =142.5 μm |
| after the splicing operation, assuming symmetrical splitting of the main carrier: | |
| minus thickness of the self-adhesive layer 6* | =105 μm |

(The thickness of the main carrier is retained beyond the significant part of the bond site).

With the adhesive tape of the invention it is possible to reduce the thickness of the bond site, which is 170 μm with prior art adhesive tapes, to 105 μm with the adhesive tape of the invention, without having to accept disadvantages in respect of the quality of the bond, particularly of the bond strengths and of the maximum web tension to be transmitted thereby, or in respect of the functionality of the splicing operation.

What is claimed is:

1. An adhesive tape suitable for flying splicing of flat web material wound up into rolls, said adhesive tape comprising:
    a) a main carrier comprising first and second faces, first and second longitudinal edges and first and second latitudinal edges;
    b) a first self-adhesive composition coated on said first face; and
    c) a second self-adhesive composition coated on a portion less than the entirety of said second face;
wherein said main carrier is composed, at least in a region where the second self-adhesive composition is coated, of a splittable material, so that when the adhesive tape is adhered between a topmost layer and an underlying layer of a first roll of paper and a flying splice is effected between the first roll of paper and a second roll of paper, the main carrier splits substantially only in the region where the second self-adhesive composition is coated.

2. The adhesive tape according to claim 1, wherein the region where the second self-adhesive composition is provided amounts to up to 50% of a total area of the second face.

3. The adhesive tape according to claim 2, wherein the region where the second self-adhesive composition is provided amounts to between 6 and 48% of a total area of the second face.

4. The adhesive tape according to claim 3, wherein the region where the second self-adhesive composition is provided amounts to between 18 and 25% of a total area of the second face.

5. The adhesive tape according to claim 1, wherein the second self-adhesive composition is arranged at a distance of from 0.5 to 15 mm from one longitudinal edge of the adhesive tape.

6. The adhesive tape according to claim 5, wherein the second self-adhesive composition is arranged at a distance of from 1 to 7 mm from one longitudinal edge of the adhesive tape.

7. The adhesive tape according to claim 6, wherein the second self-adhesive composition is arranged at a distance of from 1.5 to 3.5 mm from one longitudinal edge of the adhesive tape.

8. The adhesive tape according to claim 1, wherein the main carrier has on the second face one or more perforations or slits.

9. The adhesive tape according to claim 8, wherein each of said perforations or slits has a depth which is smaller than a thickness of the main carrier.

10. The adhesive tape according to claim 9, wherein the depth of said perforations or slits is not more than 50% of the thickness of the main paper carrier.

11. The adhesive tape according to claim 1, wherein the main carrier is composed completely of splittable material.

12. The adhesive tape according to claim 1, wherein the main carrier is not composed completely of splittable material.

13. The adhesive tape according to claim 1, wherein the main carrier comprises a substantially symmetrically splitting paper.

14. The adhesive tape according to claim 13, wherein the substantially symmetrically splitting paper has a splittability of from 10 to 50 cN/cm.

15. The adhesive tape according to claim 14, wherein the substantially symmetrically splitting paper has a splittability of from 20 to 40 cN/cm.

16. The adhesive tape according to claim 15, wherein the substantially symmetrically splitting paper has a splittability of from 20 to 30 cN/cm.

17. The adhesive tape according to claim 1, wherein the first and/or second self-adhesive composition is lined with a release material.

18. The adhesive tape according to claim 17, wherein the release material covering the first self-adhesive composition is provided with a slit or perforation.

19. A method for effecting a flying splice of flat web material wound up into rolls, said method comprising:
 a) providing an adhesive tape according to claim 1;
 b) adhering a portion of said first self-adhesive composition to an underside of a topmost web of a new roll of material;
 c) adhering said second self-adhesive composition to a topside of an underlying web of said new roll of material;
 d) accelerating said new roll of material to substantially the same speed as an unwinding roll of material;
 e) pressing the new roll against the unwinding roll of material in a manner so as to cause an unadhered portion of said first self-adhesive composition to adhere to said unwinding roll of material, thereby effecting a splice between said new roll and said unwinding roll of material, and also causing the main carrier to split in the region where the second self-adhesive composition is provided in such a way that after splitting, there are no exposed adhesive regions.

* * * * *